United States Patent
Karjee et al.

(10) Patent No.: US 10,425,954 B2
(45) Date of Patent: Sep. 24, 2019

(54) METHOD AND SYSTEM FOR COMMUNICATION LINK PREDICTION IN DISTRIBUTED ROBOTIC NETWORKS

(71) Applicant: Tata Consultancy Services Limited, Mumbai (IN)

(72) Inventors: Jyotirmoy Karjee, Bengaluru (IN); Sipra Behera, Bengaluru (IN); Hemant Kumar Rath, Bengaluru (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/866,761

(22) Filed: Jan. 10, 2018

(65) Prior Publication Data
US 2018/0288774 A1    Oct. 4, 2018

(30) Foreign Application Priority Data
Jan. 25, 2017    (IN) .............. 201721002921

(51) Int. Cl.
| | | |
|---|---|---|
| H04W 72/08 | (2009.01) | |
| H04L 29/08 | (2006.01) | |
| H04W 4/70 | (2018.01) | |
| H04W 8/00 | (2009.01) | |
| H04W 48/20 | (2009.01) | |
| H04W 84/22 | (2009.01) | |

(52) U.S. Cl.
CPC ........... *H04W 72/085* (2013.01); *H04L 67/12* (2013.01); *H04W 48/20* (2013.01); *H04W 4/70* (2018.02); *H04W 8/005* (2013.01); *H04W 84/22* (2013.01)

(58) Field of Classification Search
CPC ........ H04W 8/005; H04W 4/70; H04W 84/22
See application file for complete search history.

(56) References Cited

U.S. PATENT DOCUMENTS

| | | | |
|---|---|---|---|
| 9,426,040 B2 | 8/2016 | Vasseur et al. | |
| 2007/0274268 A1* | 11/2007 | Axelsson | ................ H04L 45/00 370/338 |

(Continued)

FOREIGN PATENT DOCUMENTS

EP    2911349    8/2015

*Primary Examiner* — Marcus Smith
(74) *Attorney, Agent, or Firm* — Finnegan, Henderson, Farabow, Garrett & Dunner LLP (57) ABSTRACT

This disclosure relates generally to distributed robotic networks, and more particularly to communication link-prediction in the distributed robotic networks. In one embodiment, robots in a robotic network, which are mobile, can establish communication with a cloud network through a fog node, wherein the fog node is a static node. A robot can directly communicate with a fog node (R2F) if the fog node is in the communication range of the robot. If there is no fog node in the communication range of the robot, then the robot can establish communication with another robot (R2R) and indirectly communicate with the fog node through the connected robot. Communication link prediction is used to identify one or more communication links that can be used by a robot for establishing communication with the cloud network. A link that satisfies requirements in terms of link quality and any other parameter is used for communication purpose.

8 Claims, 5 Drawing Sheets

(56) References Cited

U.S. PATENT DOCUMENTS

| | | | |
|---|---|---|---|
| 2010/0080157 A1* | 4/2010 | Stewart | H04W 40/026 |
| | | | 370/311 |
| 2012/0054259 A1* | 3/2012 | Peng | H04L 67/2861 |
| | | | 709/202 |
| 2016/0129592 A1 | 5/2016 | Saboo et al. | |
| 2016/0265224 A1* | 9/2016 | Byers | E04G 23/00 |
| 2017/0104834 A1* | 4/2017 | Huang | H04L 12/6418 |
| 2017/0339099 A1* | 11/2017 | Levy-Abegnoli | G06F 16/951 |
| 2018/0054772 A1* | 2/2018 | Tan | H04W 76/10 |
| 2018/0063851 A1* | 3/2018 | Abraham | H04W 72/10 |
| 2018/0184360 A1* | 6/2018 | Cavalcanti | H04W 52/0261 |

* cited by examiner

METHOD AND SYSTEM FOR COMMUNICATION LINK PREDICTION IN DISTRIBUTED ROBOTIC NETWORKS

PRIORITY CLAIM

This U.S. patent application claims priority under 35 U.S.C. § 119 to: India Application No. 201721002921, filed on 25 Jan. 2017. The entire contents of the aforementioned application are incorporated herein by reference.

TECHNICAL FIELD

This disclosure relates generally to distributed robotic networks, and more particularly to communication link-prediction in the distributed robotic networks.

BACKGROUND

In recent years, robotic communications have received tremendous attention in the literature. With cloud robotics platform in place, indoor and outdoor robotic communications, and the communication of robots to a cloud server have become a reality. Moreover, it supports a reliable communication and computing framework required for robotic communications. It also provides network services such as network coverage, network access, and on-demand services. Cloud servers also support computational services in terms of storage, processing power, information management, and so on, in the robotics platform. However, in a scenario where heterogeneous mobile robots are deployed, continuous direct communication between the robots and the cloud becomes a challenge. That means, in a scenario where multiple robots are deployed to perform various tasks and to update the gathered data to the cloud, due to distance and environmental constraints, direct or single hop communication with the cloud may not be possible. In addition to this, un-reliable communication links can trigger packet drops, thus demanding retransmission of data. However, the retransmission of data can lead to substantial transmission delay and communication cost. With the increase in communication cost, computation cost and energy consumption also increase in the network. Distributed systems are much more efficient than centralized system in terms of communication and computation in cloud robotics. In distributed systems, a task is performed by a team of robots and the mission is achieved in the lowest possible time. If some of the robots fail to operate in their mission, then rest of the robots in the team can take over the task of the failed robot.

The inventors here have recognized several technical problems with such conventional systems, as explained below. Considering the use case of an outdoor environment, where robots dynamically change their positions, it is difficult to maintain consistent end-to-end reliable communication links among the robots and between the robots and the cloud. In addition to distance and environmental factors, robotic motion also impacts the link quality. Robotic motion control results in link quality degradation due to movement of robotic wheels and this robotic motion cause's battery power drainage which in turn affects processing power.

SUMMARY

Embodiments of the present disclosure present technological improvements as solutions to one or more of the above-mentioned technical problems recognized by the inventors in conventional systems. For example, in one embodiment, a method for establishing communication in a distributed robotic network. In this method, a robot that tries to establish communication with a cloud network of the distributed robotic network transmits a beacon signal and collects response(s) to the beacon signal, from at least one node of the distributed robotic network, wherein the at least one node is a fog node or a robot. The robot then determines a link quality with the at least one node from which the response was collected, and selects the at least one node if the at least one node satisfies at least one requirement in terms of link quality, based on the determined link quality of the at least one node. The robot then establishes communication with the selected at least one node, and further establishes data transmission with the cloud network, through the selected at least one node.

In another embodiment, a distributed robotic network is provided. The distributed robotic network includes a hardware processor; and a storage medium comprising a plurality of instructions. The plurality of instructions cause the hardware processor to transmit a beacon signal by a robot in the distributed robotic network. The robot then collects response(s) to the beacon signal, from at least one node of the distributed robotic network, wherein the at least one node is a fog node or a robot. The robot then determines a link quality with the at least one node from which the response was collected, and selects the at least one node if the at least one node satisfies at least one requirement in terms of link quality, based on the determined link quality of the at least one node. The robot then establishes communication with the selected at least one node, and further establishes data transmission with the cloud network, through the selected at least one node.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
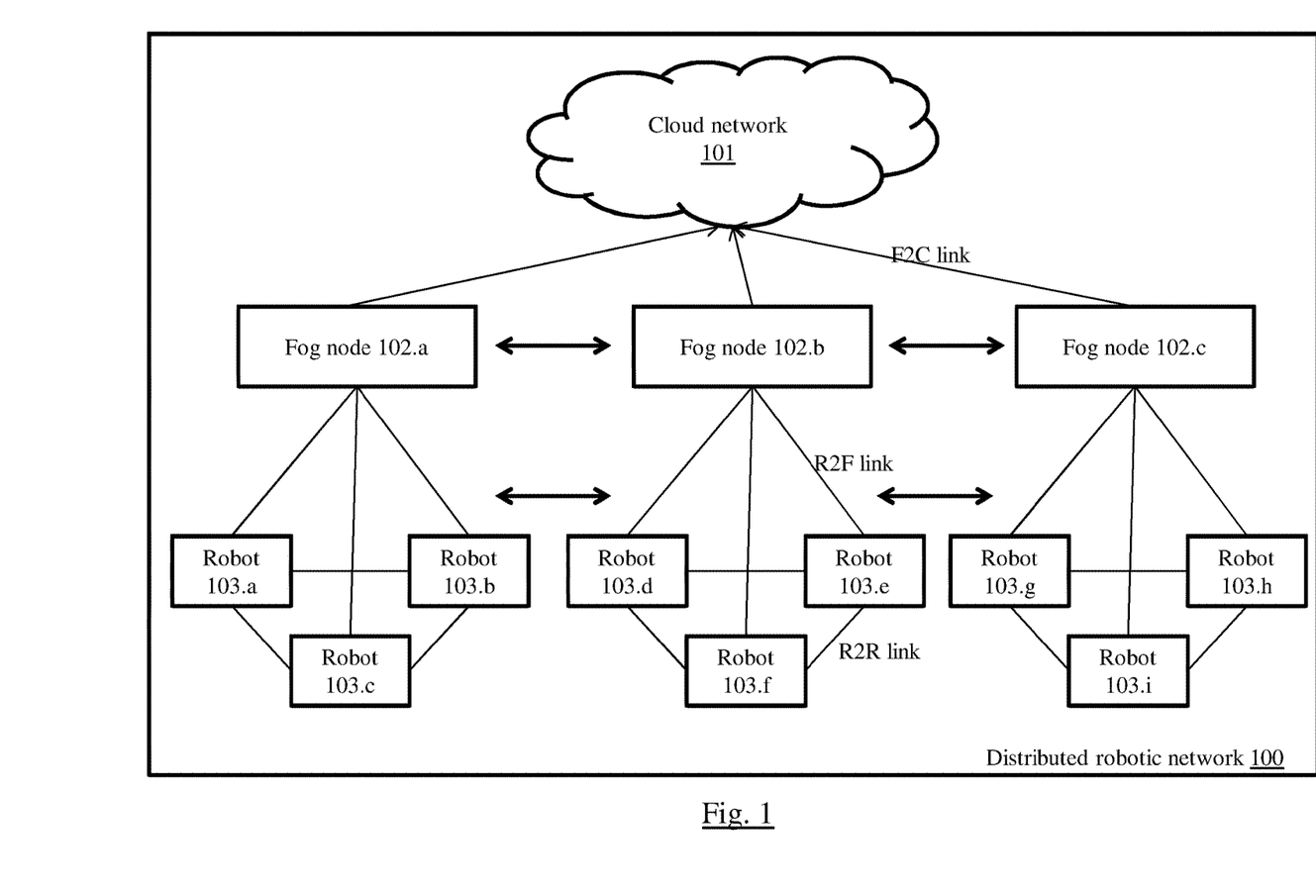
FIG. 1 illustrates a block diagram of a distributed robotic network, according to some embodiments of the present disclosure according to some embodiments of the present disclosure.

FIG. 1 illustrates a block diagram of a distributed robotic network, according to some embodiments of the present disclosure. The distributed robotic network 100 includes a cloud network 101, a plurality of fog nodes 102.a, 102.b, and 102.c (collectively referred hereinafter as 'a plurality of fog nodes 102), and a plurality of robots 103. It is to be noted that the distributed robotic network 100 (referred to as 'network 100' hereinafter) as in FIG. 1 is for illustration purpose only, and does not impose any restriction in terms of network structure, arrangement of network components, and number of each of the network components. The aforementioned parameters can vary according to implementation requirements. Further, the term 'Robot' in this context refers to any machine programmable by a computer, which is intended to carry out one or more specific action(s), and which is mobile.

Multiple robots (Robot 103.a to Robot 103.i, as in FIG. 1, collectively referred as robot(s) 103) are distributed along a geographical area. Each robot 103, for instance Robot 103.a in the network 100 is configured to establish communication with at least one neighbor robot 103, for instance Robot 103.b. Each robot 103 is further configured to establish communication with at least one fog node 102 which is in transmission coverage area of each robot 103. The term 'fog node' refers to a static node deployed in an area, which is intended to establish communication with one or more robots 103, and the cloud network 101; thereby establishing communication between the cloud network 101 and one or more robot(s) 103, for data exchange between the cloud network 101 and the robot(s) 103. The robot 103 is further configured to perform a link prediction so as to determine link quality with one or more of the neighboring nodes, and thus identify that particular link as the link to be used to establish communication with the cloud network 101.

In the network 100, each fog node 102 is configured to communicate with a plurality of robots 103 in own transmission range, thus forming a cluster. Likewise, each fog node 102 in the network 100 forms own clusters. In an embodiment, the cluster is dynamic in terms of the robots 103 that form the cluster. That means as the robots 103 in the network 100 are mobile, a robot 103 that falls in the transmission coverage area of a fog node 102 can fall out of the transmission coverage area of that particular fog node at a different instance. By then another robot 103 may enter the transmission coverage area of the fog node 102, and become part of the cluster. As a result, when a robot 103 moves out of coverage area of a fog node 102 with which the robot 103 had formed a cluster, the robot 103 can leave the cluster, and join another cluster which covers current location of the robot. The robots 103 can leave or join a cluster based on one or more parameter(s) such as but not limited to application data, wherein the application data can be video or haptic data, telematics data, robotic control data and command, robot and machine operation data, communication link strength between the robot 103 and the fog node 102, or with another robot 103 through which that particular robot 103 is connected to the fog node 102. The fog node 102 can be further configured to directly communicate with one other fog node 102. Similarly, each robot 103 can be configured to directly communicate with one or more robots 103 in same or different clusters. The fog node 102 is further configured to gather, by communicating with one or more robots 103 in the cluster, data from the robots 103 as local data, and feed the same to the cloud network 101.

The network 100 is configured to track and determine current location of each robot 103 in the network 100 in a particular cluster. The network 100 is further configured to perform a link prediction so as to determine, based on at least the determined current location of each of the neighboring nodes of each robot 103, link(s) the robot 103 can use to establish communication with neighboring nodes, wherein the link(s) thus determined satisfy a desired quality level at least in terms of signal strength, for the robot 103 to achieve communication with the cloud network 101 for data transfer. In this context, the term 'desired quality level' of signal strength is pre-defined as per requirements. In an embodiment link prediction is performed by a robot 103 of the network 100, so as to predict link quality for one or more neighboring robots 103 and fog nodes 102. In another embodiment, the link prediction are performed by a dedicated module (not shown in FIG. 1) in any other component of the network 100 such as but not limited to the cloud network 101, and/or one or more fog nodes 102, and/or a combination thereof.

The link prediction involves predicting link quality for the particular robot 103 in terms of one or more requirements for one or more parameters such as but not limited to link signal strength. For example, if the link quality for particular link that connects the robot 103 directly with corresponding fog node 102 is found to satisfying the requirement(s) of link quality (as required by real-time communication needs of the distributed robotic network 100), then that particular link can be used by the robot 103 to establish communication with the fog node 102, an in turn with the cloud network 101, and accordingly a recommendation is generated recommending R2F link. In another embodiment, if the link quality of the link (R2F link) that connects the robot 103 directly with the cloud network 101 is found to be weak, then link quality with at least one other robot in the cluster (a neighbor node) is determined, and if link quality of that particular link is found to be satisfying the requirement(s) in terms of link quality, then that particular link (R2R) is used to establish communication with the neighbor robot 102, and in turn with the fog node 102 that connects the robot 103 with the cloud network 101. In this scenario, the neighbor robot 103 acts as a relay node that connects the robot 103 with the fog node 102, and thus with the cloud network 101 (R2R link-R2F link-F2C link). In an embodiment, as the clusters are dynamic, the link prediction is also dynamic in nature. In various embodiments, the communication between Robots (R2R link), between robot and fog node (R2F link), and between fog node and cloud (F2C) can happen instantly as and when required, or at periodic intervals. Similarly if the robot 103 is falling in coverage area of two or more fog nodes 102, then the robot 103 selects fog node 102 to interact with, based on the link quality with the fog nodes 102.

Figure 2A:
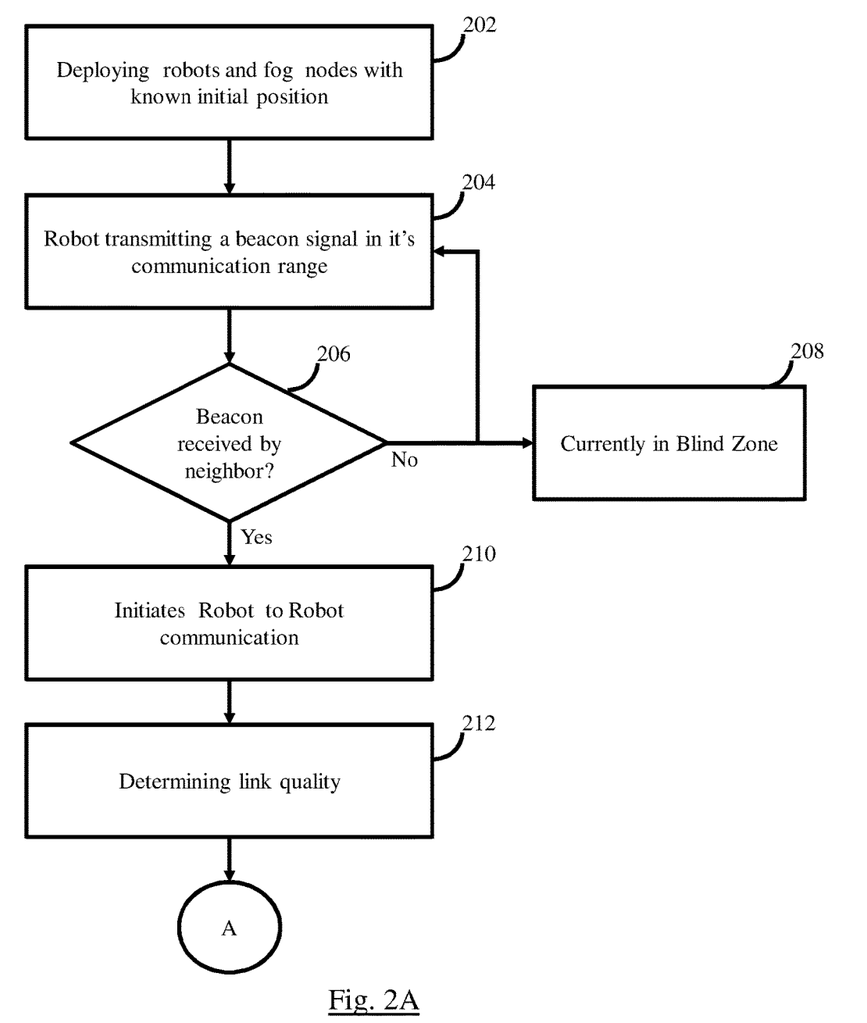
FIG. 2A and FIG. 2B are flow diagrams illustrating steps involved in the process of link prediction in the distributed robotic network for the purpose of managing communication, in accordance with some embodiments of the present disclosure.
Figure 2B:
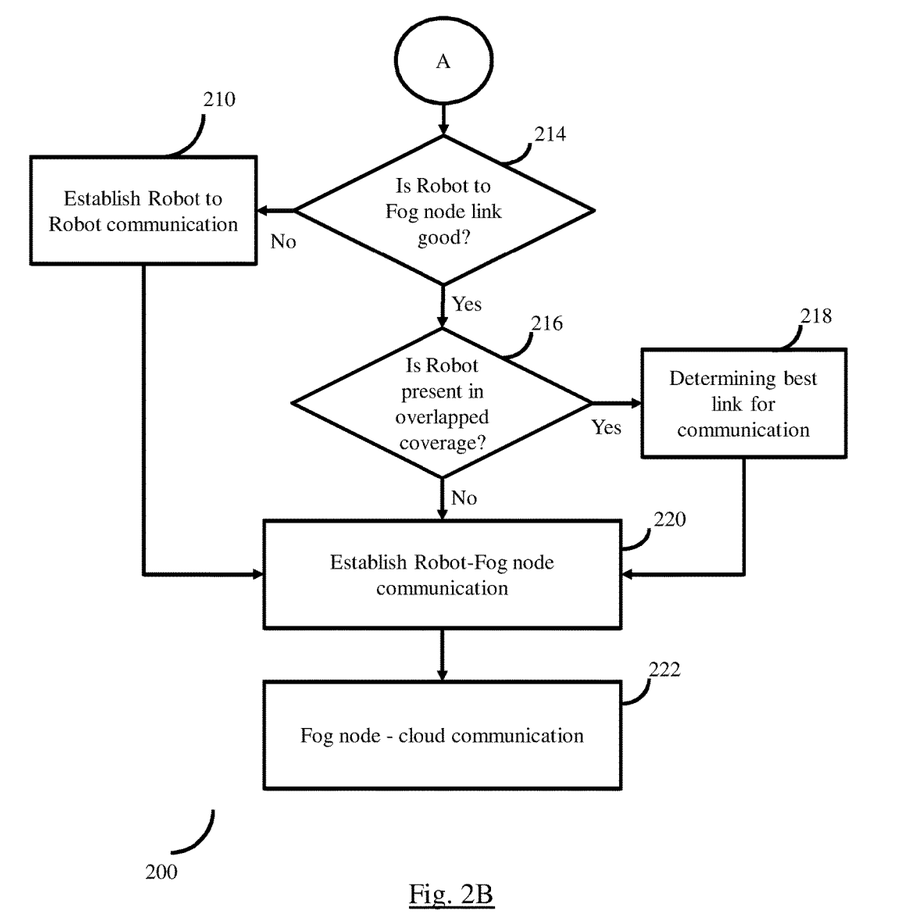

FIG. 2 is a flow diagram illustrating steps involved in the process of link prediction in the distributed robotic network for the purpose of managing communication, in accordance with some embodiments of the present disclosure. In this mechanism, initially the robots 103 and fog nodes of the network 100 are deployed (202) with known initial locations. However, due to dynamic nature of the network 100, the robots 103 move around, and hence the location changes from the initial known location, and accordingly, the link(s)

each robot 103 can use to establish communication with the cloud network 101 also varies from time to time.

In order to identify other robot(s) 103 and/or fog nodes 102 in own communication range, a robot 103 transmits (204) a beacon signal. If the beacon signal has not been received by any neighbor (wherein the 'neighbor' can be another robot 103 or fog node 103), then the robot 103 that transmitted the beacon signal is considered to be in a 'blind zone' (208) for the time being, wherein 'blind zone' refers to location of the robot 103 such that all other robots 103 and fog nodes 102 of the network 100 are out of transmission coverage area of the robot 103.

If the beacon signal has been received by one or more neighbors, then the robot to robot 103 communication is initiated (210). Further, based on robot to robot communication, a Collaborative Robotic Link Prediction (CRLP) mechanism is executed to identify communication link(s) among robot pairs 103, and determine (212) link quality among the robot pairs. An example implementation of the CRLP mechanism, using Kalman Filter is considered. It is to be noted that Kalman Filter can be substituted with any other scheme, as required.

Example Implementation of CRLP Using Kalman Filter

Once the clusters have been formed, it is assumed that M robots are establishing communication path among themselves. Each robot 103 in a cluster consists of pose given as $\hat{X}_t^i = [x_{t_i}\ y_{t_i}\ \theta_{t_i}]^T$, where $i \in M$ at any time t. State equation of a robot is represented using Kalman Filter as:

$$\hat{X}_t = A\hat{X}_{t-1} + Bu_t \quad (1)$$

Where $\hat{X}_t$ is the predicted state at time 't' based on previous state $\hat{X}_{t-1}$. The vector $u_t$ captures robot control information. A is n×n matrix which determines robot pose behavior, B is n×z control input matrix for both $X_t \in R^n$ and $u_t \in R^z$ at time instance t. The observation $Z^t \in R^m$ obtained by each robot is given as:

$$Z_t = H\hat{X}_t + \varepsilon_\theta \quad (2)$$

where H is an m*n matrix to capture measurement for $Z_t$ and $\varepsilon_0$ represents random noise in the network 100. Based on (1) and (2), CRLP methodology is modeled, which depends on the following parameters:

Apriori State ($\hat{X}_t$): Predicts next state based on previous state $\hat{X}_{t-1}$.

Observation ($Z^t$): Depends on state vector $\hat{X}_t$

Posteriori ($x_t$): It is combination of apriori state and observation, represented as: $\hat{X}_t = \hat{X}_t + K_t(Z_t - H\hat{X}_t)$, where $K_t$ is Kalman gain at time t.

The CRLP methodology based on Kalman filter is divided into two states:

1) Prediction state: in this state, the apriori estimate $\hat{X}_t$ is predicted based on the previous state $\hat{X}_{t-1}$ and control state $u_t$. Further, in the prediction state, each robot 103 in motion is considered to have the following parameters: Width (w), Centre of Movement (O), Turning Angle (a), Header Angle (θ), Radius (R), and Wheel motion Arc.

2) Correction State: In this state, the predicted state is corrected based on the observation.

In this methodology, it is assumed that the Robot 103 moves with a left turn from the centre of movement, Pose $\hat{X}_t$ of the robot 103 at any time instance t is given as:

$$\hat{X}_t = \begin{bmatrix} \hat{x}_{(t-1)_i} \\ \hat{y}_{(t-1)_i} \\ \hat{\theta}_{(t-1)_i} \end{bmatrix} + \begin{bmatrix} (R_i + \frac{\omega}{2})(\sin(\theta_{(t-1)_i} + \alpha_i) - \sin\theta_i) \\ (R_i + \frac{\omega}{2})(-\cos(\theta_{(t-1)_i} + \alpha_i) + \cos\theta_i) \\ \alpha_i \end{bmatrix} \quad (3)$$

Therefore, the state $\hat{X}_t$ is combination of previous state and motion control of the robot 103. The state $\hat{X}_t$ is a non-linear function denoted by $g(\hat{X}_{(t-1)_i}, \hat{u}_{t_i})$. This non-linear function can be linearized by using Extended Kalman Filter. The EKF calculates predicted co-variance as:

$$\Sigma_t = J_t \Sigma_{(t-1)_p} J_t^T + Q_t \quad (4)$$

where, $J_t$ is Jacobian Matrix of $g(\hat{X}_{(t-1)_i}, \hat{u}_{t_i})$. A co-variance matrix $$\sum_{(t-1)_p} = \begin{pmatrix} \sigma_{x_i} & 0 & 0 \\ 0 & \sigma_{y_i} & 0 \\ 0 & 0 & \sigma_{\theta_i} \end{pmatrix}$$

captures covariance of each robot pose. Now, $g(\hat{X}_{(t-1)_i}, \hat{u}_{t_i})$ consists of individual representation with respect to $x_i$, $y_i$, and $\theta_i$ for each robot 'i' as:

$$g(\hat{x}_{(t-1)_i}, \hat{u}_{t_i}) = \begin{bmatrix} g_1(\hat{x}_{(t-1)_i}, \hat{u}_{t_i}) \\ g_2(\hat{x}_{(t-1)_i}, \hat{u}_{t_i}) \\ g_3(\hat{x}_{(t-1)_i}, \hat{u}_{t_i}) \end{bmatrix} = \begin{bmatrix} G_1 \\ G_2 \\ G_3 \end{bmatrix} \quad (5)$$

and the Jacobian matrix is given as:

$$J_t = \begin{bmatrix} \frac{\partial G_1}{d_x} & \frac{\partial G_1}{d_y} & \frac{\partial G_1}{d_\theta} \\ \frac{\partial G_2}{d_x} & \frac{\partial G_2}{d_y} & \frac{\partial G_2}{d_\theta} \\ \frac{\partial G_3}{d_x} & \frac{\partial G_3}{d_y} & \frac{\partial G_3}{d_\theta} \end{bmatrix} \quad (6)$$

Covariance matrix is expressed as:

$$Q_t = F_t \sum_{(t-1)_c} F_t^T = F_t \begin{bmatrix} \sigma_l & 0 \\ 0 & \sigma_r \end{bmatrix} F_t^T \quad (7)$$

where $F_t$ is expressed as Jacobian Matrix for control state $(l_i, r_i)$ for robot 'i'. $\sigma_l$ and $\sigma_r$ are motion variances that are captured while calculating Jacobian matrix for $F_t$. Partial derivatives for the non-linear function is derived with respect to wheel motion l and r followed by:

$$F_t = \begin{bmatrix} \frac{\partial G_1}{\partial l} & \frac{\partial G_1}{\partial r} \\ \frac{\partial G_2}{\partial l} & \frac{\partial G_1}{\partial r} \\ \frac{\partial G_3}{\partial l} & \frac{\partial G_3}{\partial r} \end{bmatrix}$$

A function $h(\hat{X}_t)$ is used to express a measured distance from a neighbor (j) and angle of turning, wherein $$h(\hat{X}_t) = \begin{bmatrix} h_1(\hat{X}_t) \\ h_2(\hat{X}_t) \end{bmatrix} = \begin{bmatrix} D_{i,j} \\ \alpha_{i,j} \end{bmatrix}$$

$h(\hat{x}_t)$ is expressed in terms of Jacobian Matrix $H_{i,j}$ for robots i and j as:

$$H_{i,j} = \begin{bmatrix} \frac{\partial D_{i,j}}{\partial x} & \frac{\partial D_{i,j}}{\partial y} & \frac{\partial D_{i,j}}{\partial \theta} \\ \frac{\partial \alpha_{i,j}}{\partial x} & \frac{\partial \alpha_{i,j}}{\partial y} & \frac{\partial \alpha_{i,j}}{\partial \theta} \end{bmatrix} \quad (8)$$

where $H_{i,j}$ matrix expresses the distance Di,j from robot 'i' to its neighboring robot 'j' coordinates and αi,j is the left turning angle made by robot i with respect to robot 'j'. Di, j and αi, j are computed as:

$$D_{i,j} = \sqrt{(x_i - x_j)^2 + (y_i - y_j)^2} \text{ and}$$

$$\alpha_{i,j} = \tan\frac{(y_j - y_i)}{(x_j - x_i)} - \theta_i$$

Link quality measurements among a group of robots 103 are executed using a Received Signal Strength Indicator (RSSI). Using RSSI, signal power received by robot 'j' transmitted by the robot 'i' is measured as:

$$\acute{P}_{i,j} = \acute{P}_0 - 10n_p \log_{10} \frac{D_{i,j}^c}{d_0} \quad (9)$$

where $\acute{P}_0$ is received power (in dBm) at a reference distance d0 from a fog node 102 (or a robot 103) within the cluster being considered. $n_p$ is the path loss exponent. Path length $D_{i,j}^c$ among robots i and j for communication range is given as:

$$D_{i,j}^c = d_0 10^{\frac{(P_o - P_{i,j})}{10n_p}} \quad (10)$$

Thus the matrix $H_{i,j}$ maintains link quality among robot i and robot j in all clusters of the network 100.

Now the correction state acts as a feedback mechanism in which a new observation is incorporated into a-priori estimates to improve a-posteriori estimates. The posteriori estimates is represented as:

$$\hat{X}_t = \hat{X}_t + K_t(Z_t - H\hat{X}_t) \quad (11)$$

where $K_t$ is the Kalman gain at a time instance t, represented as:

$$K_t = \Sigma_t H^T (H \Sigma_t H_t^T + R)^{-1} \quad (12)$$

$K_t$ captures both pose and location information of a robot and environmental noise variance matrix $$R = \begin{bmatrix} \sigma_l & 0 \\ 0 & \sigma_r \end{bmatrix}$$

for left and right wheels motion. Posteriori estimate covariance matrix is represented as:

$$\Sigma_t (I - K_t H) \Sigma_t \quad 13$$

This error covariance gives the approximate link prediction, where a pair of robot i and j can predict a guaranteed end-to-end communication link based on a threshold value. In the covariance matrix, if the majority of the error covariance values is less than the threshold value, possibility of finding link availability is less. Further, in the cluster based architecture of the network 100, total energy dissipation is equal to collective dissipation by each cluster. To explain this, consider one deployment scenario of the distributed robotic network 100, in which each cluster has M varying mobile robots 103 and uniformly distributed f fog nodes 102. Therefore, the total energy consumed in a cluster $E_{cluster}$ is given by:

$$E_{cluster} = E_f \Sigma_{i=1}^M E_{r_i} \quad (14)$$

where Et is energy consumed by fog node 102 and $E_{r_i}$ is energy consumed by each associated robot 103. Energy consumed at the fog node 102 of a cluster is expressed as:

$$E_f = \aleph (E_{elec} M + E_{AL}(M+1) + E_{Elec} + \psi_{amp} d_{toCloud}^4) \quad (15)$$

Where,
$E_{elec}M$=received energy
$E_{AL}(M+1)$=Aggregated energy
$E_{Elec} + \psi_{amp} d_{toCloud}^4$=Transmitted energy
where ℵ is the number of times a robot 103 broadcasts request to establish a link per second, $E_{elec}$ is the energy dissipated due to radio electronics, $E_{AL}$ is the energy consumed for aggregated links, $\psi_{amp} d^4$ is the amplifier energy for multipath and $d_{toCloud}^4$ is the distance from the fog node 102 to cloud network 101. A threshold ε is defined such that if the distance is greater than ε, a multipath model is used. Energy consumed by each mobile robot 103 in a cluster is given by:

$$E_r = \aleph \cdot (E_{elec} + \psi_{fs} d_{toFog}^2) + E_{motion} \quad (16)$$

where $\psi_{fs}$ is the amplifier energy for free space, $d_{toFog}^2$ is the distance from mobile robot 103 to fog node 102. $E_{motion}$ is the dissipated energy due to motion of a robot 103 in a cluster given by:

$$E_{motion} = 2E_{K.E} + E_{fric} \quad (17)$$

where $E_{K.E}$ is the energy consumed by Kinetic Energy and $E_{fric}$ is the energy losses due to ground friction. Kinetic energy of a robot 103 is expressed in-terms of mass and velocity given by:

$$KE = \frac{1}{2} * mass * velocity^2 \quad (18)$$

To encounter energy losses by ground friction, Deceleration Ratio (D.R) is considered. D.R is defined as the number of times required to re-accelerate to unit distance. Thus, energy loss due to friction is given as $E_{fric} = D.R * \delta d * K.E$, where $\delta d$ is the distance traversed by the robot 103. Substituting (15) and (16) in (14), we obtain the total energy consumed for a cluster. If there are K number of clusters in a network, then the total energy consumed in the entire network is given as:

$$E_{Total} = \Sigma_{i=1}^K E_{cluster_i} \quad (19)$$

Example Implementation and Experimental Results

Simulations are conducted using a joint Robot Operating System (ROS)/Gazebo, MATLAB and Network simulator (NS-3). All the mobility, position, topology, etc., of robots are simulated using Gazebo in ROS platform. The outputs of the mobility pattern along with the topographic information are fed in MATLAB simulation to perform the CRLP mechanism. To validate the CRLP mechanism, we feed the topographic information of robots in NS-3 simulator to compute actual RSSI. Husky robots are considered in Gazebo simulator which is mostly used in robotic research. The deployment region is taken as a 40 meters×40 meters grid area where 19 Husky robots are deployed randomly with 4 fixed fog nodes. Coverage radius of fog nodes is assumed to be 25 meters whereas the coverage radius of robots is assumed to be 20 meters. Out of the 19 robots, mobility pattern of only 9 robots are captured. The movements of the robots are considered as random. To avoid collision among robots, appropriate collision avoidance algorithm is implemented. The parameters for both right and left wheels of robot as well as width between the wheels are captured using Gazebo simulator. In Gazebo, the mobility pattern of the 9 mobile robots is set as in Table I. Each robot pose (x, y, θ) is captured during its mobility using Gazebo simulator.

TABLE 1

| Robot No. | Linear Velocity (in m/s) | Angular velocity (in rad) |
|---|---|---|
| 1 | 5 | 1.412 |
| 2 | 7 | 0.986 |
| 3 | 7 | 0.986 |
| 4 | 7 | 0.986 |
| 5 | 7 | 0.986 |
| 6 | 7 | 0.986 |
| 7 | 3 | 0.536 |
| 8 | 3 | 0.536 |
| 9 | 5 | 1.412 |

Based on a model depicted in FIG. 1, dynamic clusters are being formed as shown in Table 2.

TABLE 2

| Time stamp t | Fog 1 | Fog 2 | Fog 3 | Fog 4 |
|---|---|---|---|---|
| 83.35 | 1, 2, 6 | 8, 9 | — | 3, 4, 5, 7 |
| 84.39 | 1, 2, 6 | 8, 9 | — | 3, 4, 5, 7 |
| 85.39 | 1, 2, 6 | 8 | 9 | 3, 4, 5, 7 |
| 86.43 | 1, 2, 6 | 8 | 5, 9 | 3, 4, 7 |
| 87.43 | 1, 2, 6 | 8 | 5, 9 | 3, 4, 7 |
| 88.47 | 1, 2 | 8 | 5, 9 | 3, 4, 6, 7 |
| 89.51 | 1, 2, 3 | 8 | 5, 7, 9 | 4, 6 |
| 90.55 | 1, 2, 3 | 8 | 5, 7, 9 | 4, 6 |
| 91.55 | 1, 2, 3 | 8 | 5, 7, 9 | 4, 6 |
| 92.59 | 1, 2, 3 | 8 | 5, 7, 9 | 4, 6 |

Association of a robot with a cluster depends upon predicted signal strength and mobility pattern. Though the simulation starts at time stamp t=0, the results are presented from time stamp t=33.87 second onwards; initial time is spent for convergence. The entire simulation time is considered from time interval t=33.87 second to t=138.99 second, however in Table 2 depicts only the cluster formation for time interval t=83.35 second to t=92.59 second. Based on the communication link strength between fog node and robots in the distributed robotic network, robots can join or leave a cluster, which is similar to hand-off mechanism in communication systems.

To validate total energy consumed in the network for the network, consider the following parameters: $E_{elec}$=50 nJ/bit, $E_{AL}$=5 nJ/bit/signal, $\psi_f$=10 pJ/bit/m$^2$, $\psi_{amp}$=10 pJ/bit/m$^2$.

In Table 3, comparative study for energy consumed using distributed robotic network model and direct R2C communication are given from t=83.35 second to t=92.59 second. The result shows that energy consumed by distributed robotic network model is 0.0542 Joules whereas energy consumed due to direct R2C communication is 0.2795 Joules in the network. However, upon considering entire simulation run time from t=83.35 second to t=138.99 second, it is clear that the energy consumed by distributed robotic network model is 0.5568 Joules and energy consumed due to direct R2C communication is 3.2140 Joules. The results depict that direct R2C communication spends more energy than distributed robotic network model in the network. This is because of multiple factors such as but not limited to long distance communication, low link rate, poor signal characteristics, and so on. Note that other than improvement in energy consumption, reliable communication is only possible in the case of the distributed robotic network model as multi-hop guaranteed communication links are being provisioned. However it may increase the delay in communication which needs to be examined in detail in the future.

TABLE 3

| | Energy consumed (in Joules) for the network | | | | | |
|---|---|---|---|---|---|---|
| | Distributed Robotic Network | | | | | Direct |
| Time | Fog 1 | Fog 2 | Fog 3 | Fog 4 | Total Energy | Communication Total Energy |
| 83.35 | 0.0018 | 0.0012 | 0 | 0.0024 | 0.0054 | 0.0170 |
| 84.39 | 0.0018 | 0.0012 | 0 | 0.0024 | 0.0054 | 0.0238 |
| 85.39 | 0.0018 | 0.0006 | 0.0006 | 0.0025 | 0.0055 | 0.0252 |
| 86.43 | 0.0018 | 0.0006 | 0.0012 | 0.0018 | 0.0054 | 0.0282 |
| 87.43 | 0.0018 | 0.0006 | 0.0012 | 0.0018 | 0.0054 | 0.0288 |
| 88.47 | 0.0012 | 0.0006 | 0.0012 | 0.0025 | 0.0055 | 0.0293 |
| 89.51 | 0.0018 | 0.0006 | 0.0018 | 0.0012 | 0.0054 | 0.0318 |
| 90.55 | 0.0018 | 0.0006 | 0.0018 | 0.0012 | 0.0054 | 0.0318 |
| 91.55 | 0.0018 | 0.0006 | 0.0018 | 0.0012 | 0.0054 | 0.0318 |
| 92.59 | 0.0018 | 0.0006 | 0.0018 | 0.0012 | 0.0054 | 0.0318 |

To validate link prediction mechanism, instead of using the global positioning system, posteriori estimate of error covariance is used. Each robot computes the error covariance matrix and based on the value obtained, it predicts communication links such that the possible peer robot can be selected through which R2R communication is performed. Though each robot can compute the covariance matrix of self with other deployed robots, in practice this can be avoided to save both compute and communication power. The robots which do not fall under any available cluster can compute their covariance matrix with the nearest robots to select peers and finally communicate with the cloud. By doing this, robots can predict the links for R2R communications. Therefore, using the R2R communication, a robot which is out of the cluster ranges can create a multi-hop (possible multiple R2R communication links in addition to R2F and F2C communication) end-to-end communication path to the cloud. R2R communication is also useful inside a cluster such that spectrum re-use can be obtained by using a device to device (D2D) communication framework.

To evaluate the performance of the CRLP method for the covariance based link prediction, experiments are conducted using selected nine mobile robots which can create 36 R2R communication pairs. Out of the 36 pairs possible at t=84.39 second, it can be observed that only 10 pairs can only have possible R2R communication and 26 pairs doesn't have R2R communications. This is verified through the error covariance matrix obtained using the simulations. However in Table 4, 6 possible robot pairs are randomly chosen from the 36 R2R pairs. Based on error covariance matrix absolute values, it is predicted that robot pairs R1-R3, R3-R5 and R4-R7 can have possible R2R communications, whereas robot pairs R2-R8, R2-R9 and R6-R8 cannot; verified using the available position, the communication distance and with a fixed threshold value of 0.0021. Therefore, CRLP method gives a qualitative measure of communication link among the robots in the deployment scenario.

TABLE 4 t = 84.39 Second          Posteriori estimate error covariance matrix

R2R communication $$\sum_{R_{1-3}} = \begin{pmatrix} -0.0598 & -0.1492 & 0.0236 \\ -0.1492 & -0.3723 & 0.0588 \\ 0.0236 & 0.0588 & -0.0093 \end{pmatrix}$$

$$\sum_{R_{3-5}} = \begin{pmatrix} -0.0264 & 0.0391 & -0.0073 \\ -0.0391 & -0.0581 & 0.0108 \\ -0.0073 & 0.0108 & -0.0020 \end{pmatrix}$$

$$\sum_{R_{4-7}} = \begin{pmatrix} 0.1460 & 0.1802 & 0.0508 \\ 0.1802 & 0.2225 & 0.0627 \\ 0.0508 & 0.0627 & 0.0177 \end{pmatrix}$$

Non R2R communication $$\sum_{R_{2-8}} = \begin{pmatrix} 0.0000 & -0.0000 & 0.0000 \\ 0.0000 & 0.0000 & 0.0000 \\ 0.0000 & -0.0000 & 0.1126 \end{pmatrix}$$

$$\sum_{R_{2-9}} = \begin{pmatrix} 0.0001 & -0.0000 & -0.0024 \\ 0.0000 & 0.0000 & -0.0015 \\ 0.0024 & -0.0015 & 0.1126 \end{pmatrix}$$

$$\sum_{R_{6-8}} = \begin{pmatrix} 0.0021 & 0.0003 & 0.0072 \\ 0.0003 & 0.0000 & 0.0010 \\ 0.0072 & 0.0010 & 0.0241 \end{pmatrix}$$

Figure 3:
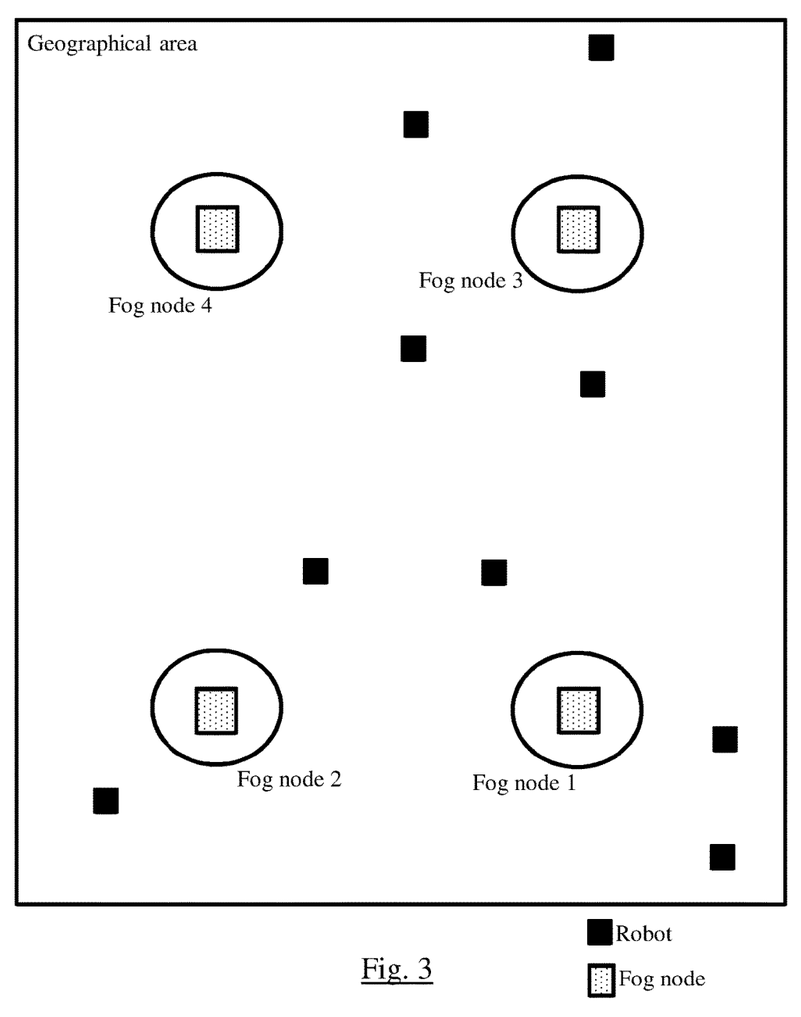
FIG. 3 is an example diagram illustrating deployment of fog nodes and robots in a geographical area, in accordance with some embodiments of the present disclosure.
Figure 4:
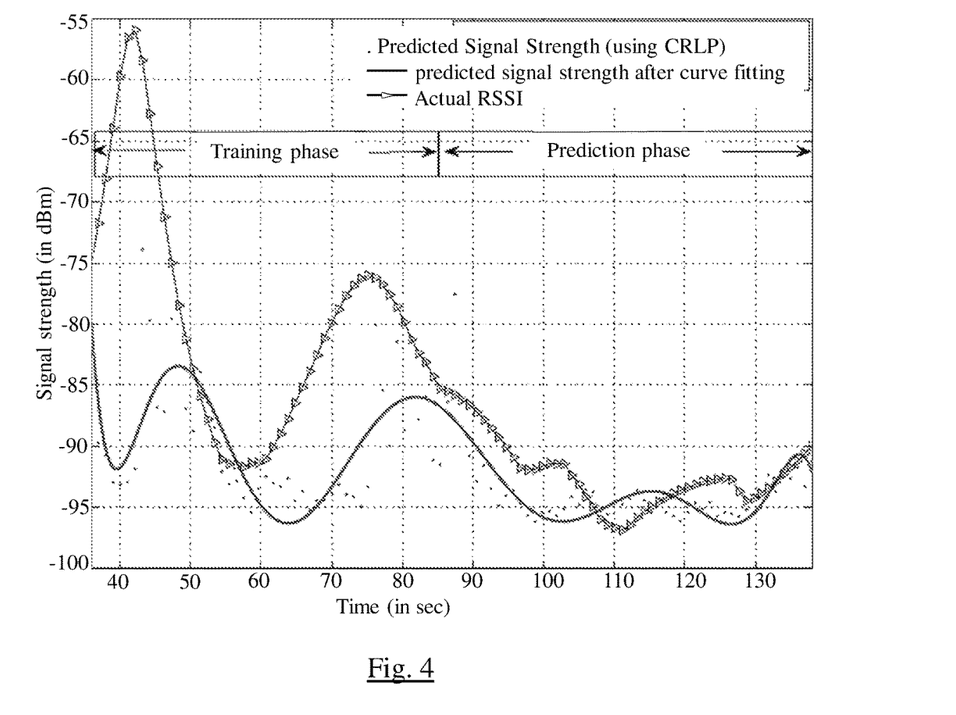
FIG. 4 is a graphical representation of results of an example link prediction scenario in accordance with some embodiments of the present disclosure.

Signal strength (in dBm) measured by a robot pair (say R1-R2), for the deployment scenario depicted in FIG. 3, from time instant 33.87 second to 138.99 second is computed as shown in FIG. 4. The actual signal strength is measured by RSSI and is compared with the quantitative predicted signal strength measured for CRLP mechanism by the robot pair. To compute quantitative measurement for R2R communication, a Feature Scaling Normalization method is adopted, which needs actual RSSI information for the entire simulation time as an input. To quantify signal strength, trace of each error covariance matrix is stored in an array $A=[a_1\ a_2\ \ldots\ a_T]$ where $a_t=tr(\Sigma R_{t-j})$ is an element of the array for time instant $t=\{1, 2, \ldots, T\}$ for robot i and j. Further, each element of array is normalized as $$a'_t = \frac{a_t - \min(a_t)}{\max(a_t) - \min(a_t)}$$

and the array is updated as A'. Moreover to quantify R2R communication link, RSSI measures signal strength value $(RSSI_t)$ for time instant $t=\{1, 2, \ldots T\}$. The range of signal strength is given by $RSSI_{Range}=[\max(RSSI_t)-\min(RSSI_t)]$ where max (RSSI) and min (RSSI) are the maximum and minimum RSSI values measured. Finally the quantitative predicted signal strength value is given by $a_t''= (a_t'*RSSI_{Range})+\min(RSSI_t)$, and stored in an array as $A''=[a_1'', a_2'', \ldots a_T'']$. Quantitative predicted signal strength value $(a_t'')$ from time instance $t\{1\}=33.87$ second to $t\{T\}=138.99$ second is depicted in FIG. 4. FIG. 4 indicates that as time progresses, the link prediction mechanism described herein provides accurate quantitative predicted signal strength values compared to RSSI values. The values depicted in FIG. 4 further show that the quantitative predicted signal strength converges to actual signal measured by RSSI for a robot pair R1-R2.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for establishing communication in a distributed robotic network, said method comprising:
transmitting a beacon signal by a robot from a plurality of robots in the distributed robotic network, wherein the distributed robotic network comprises a cloud network, a plurality of fog nodes, and the plurality of robots, wherein the distributed robotic network is dynamic in nature and the plurality of robots move around and change their location, and each fog node is configured to communicate with the plurality of robots in its own transmission range forming a cluster of robots, wherein forming the cluster is dynamic as the plurality of robots are mobile thereby moving in or out of the transmission range of the fog node, wherein the fog node is a static node deployed in an area intended to establish communication between the plurality of robots and the cloud network;

collecting a response to the beacon signal, from at least one node of the distributed robotic network, by the robot, wherein the at least one node is a fog node or a robot;

dynamically determining a link quality with the at least one node from which the response was collected, by the robot, wherein the link quality is measured in terms of a Received Signal Strength Indicator (RSSI) with the at least one node, and wherein using the RSSI, signal power received by a robot 'j' transmitted by a robot 'i' is measured as:

$$\acute{P}_{i,j} = \acute{P}_0 - 10 n_p \, \log_{10} \frac{D_{i,j}^c}{d_0}$$

where $\acute{P}_0$ is received power (in dBm) at a reference distance d0 from a fog node or a robot within the cluster, $n_p$ is the path loss exponent, wherein Path length $D_{i,j}^c$ among robots i and j for communication range is given as:

$$D_{i,j}^c = d_0 10^{\frac{(P_0 - P_{i,j})}{10 n_p}};$$

selecting the at least one node if the at least one node satisfies at least one requirement in terms of link quality, based on the determined link quality of the at least one node, by the robot;

establishing communication with the selected at least one node, by the robot; and establishing data transmission with the cloud network of the distributed robotic network, through the selected at least one node, by the robot.

2. The method as claimed in claim 1, wherein a Collaborative Robotic Link Prediction (CRLP) mechanism is executed to identify the communication links among robot pairs and to determine the link quality among the robot pairs.

3. The method as claimed in claim 1, wherein establishing a data transmission comprises:

establishing a connection with the fog node of the distributed robotic network, by the robot, if the determined link quality with the fog node meets a threshold value of link quality; and establishing a connection with the fog node through another robot of the distributed robotic network, by the robot, if the determined link quality with the fog node does not meet the threshold value of link quality, wherein the determined link quality with the another robot meets the threshold value of link quality.

4. A distributed robotic network, comprising:
a cloud network;
a plurality of fog nodes; and
a plurality of robots, wherein the distributed robotic network is dynamic in nature and the plurality of robots move around and change their location, and each fog node is configured to communicate with the plurality of robots in its own transmission range forming a cluster of robots, wherein forming the cluster is dynamic as the plurality of robots are mobile thereby moving in or out of the transmission range of the fog node, wherein the fog node is a static node deployed in an area, intended to establish communication between the plurality of robots and the cloud network, and wherein each robot of the plurality of robots comprises:

a hardware processor; and a storage medium comprising a plurality of instructions, said plurality of instructions causing the hardware processor to:

transmit a beacon signal by a robot in the distributed robotic network;

collect a response to the beacon signal, from at least one node of the distributed robotic network, by the robot, wherein the one node is a fog node or a robot;

dynamically determine a link quality with the at least one node from which the response was collected, by the robot, wherein the link quality is measured in terms of a Received Signal Strength Indicator (RSSI) with the at least one node, and wherein using the RSSI, signal power received by a robot 'j' transmitted by a robot 'i' is measured as:

$$\acute{P}_{i,j} = \acute{P}_0 - 10 n_p \, \log_{10} \frac{D_{i,j}^c}{d_0}$$

where $\acute{P}_0$ is received power (in dBm) at a reference distance d0 from a fog node or a robot within the cluster, $n_p$ is the path loss exponent, wherein Path length $D_{i,j}^c$ among robots i and j for communication range is given as:

$$D_{i,j}^c = d_0 10^{\frac{(P_0 - P_{i,j})}{10 n_p}};$$

select the at least one node, if the at least one node satisfies at least one requirement in terms of link quality, based on the determined link quality, by the robot;

establish communication with the selected at least one node, by the robot; and establish data transmission with the cloud network of the distributed robotic network, through the selected at least one node, by the robot.

5. The distributed robotic network as claimed in claim 4, wherein a Collaborative Robotic Link Prediction (CRLP) mechanism is executed to identify communication links among robot pairs, and to determine the link quality among the robot pairs.

6. The distributed robotic network as claimed in claim 4, wherein the robot is configured to establish the data transmission by:

establishing a connection with the fog node of the distributed robotic network, by the robot, if the predicted link quality with the fog node meets a threshold value of link quality;

establishing a connection with the fog node through another robot of the distributed robotic network, by the robot, if the predicted link quality with the fog node does not meet the threshold value of link quality, wherein predicted link quality for the another robot meets the threshold value of link quality; and establishing a connection with the cloud network, through the fog node.

7. One or more non-transitory machine readable information storage mediums comprising one or more instructions which when executed by one or more hardware processors causes:

transmitting a beacon signal by a robot from a plurality of robots in a distributed robotic network, wherein the distributed robotic network comprises a cloud network, a plurality of fog nodes, and the plurality of robots, wherein the distributed robotic network is dynamic in nature and the plurality of robots move around and change their location, and each fog node is configured to communicate with the plurality of robots in its own transmission range forming a cluster of robots, wherein forming the cluster is dynamic as the plurality of robots are mobile thereby moving in or out of the transmission range of the fog node, wherein the fog node is a static node deployed in an area intended to establish communication between the plurality of robots and the cloud network;

collecting a response to the beacon signal, from at least one node of the distributed robotic network, by the robot, wherein the at least one node is a fog node or a robot;

dynamically determining a link quality with the at least one node from which the response was collected, by the robot, wherein the link quality is measured in terms of a Received Signal Strength Indicator (RSSI) with the at least one node, and wherein using the RSSI, signal power received by a robot 'j' transmitted by a robot 'i' is measured as:

$$\acute{P}_{i,j} = \acute{P}_0 - 10 n_p \, \log_{10} \frac{D^c_{i,j}}{d_0}$$

where $\acute{P}_0$ is received power (in dBm) at a reference distance d0 from a fog node or a robot within the cluster, $n_p$ is the path loss exponent, wherein Path length $D_{i,j}^c$ among robots i and j for communication range is given as:

$$D^c_{i,j} = d_0 10^{\frac{(P_0 - P_{i,j})}{10 n_p}} \; ;$$

selecting the at least one node if the at least one node satisfies at least one requirement in terms of link quality, based on the determined link quality of the at least one node, by the robot;

establishing communication with the selected at least one node, by the robot; and establishing data transmission with the cloud network of the distributed robotic network, through the selected at least one node, by the robot.

8. The one or more non-transitory machine readable information storage mediums of claim 7, wherein the one or more instructions which when executed by the one or more hardware processors, for establishing the data connection, further cause:

establishing a connection with the fog node of the distributed robotic network, by the robot, if the determined link quality with the fog node meets a threshold value of link quality; and establishing a connection with the fog node through another robot of the distributed robotic network, by the robot, if the determined link quality with the fog node does not meet the threshold value of link quality, wherein the determined link quality with the another robot meets the threshold value of link quality.

* * * * *